United States Patent [19]

Ervin

[11] Patent Number: 4,865,263

[45] Date of Patent: Sep. 12, 1989

[54] INERTIA RESPONSIVE SEAT BELT RETRACTOR WITH WEB LOCKER

[75] Inventor: Paul R. Ervin, Dearborn, Mich.

[73] Assignee: Ford Motor Company, Dearborn, Mich.

[21] Appl. No.: 253,829

[22] Filed: Oct. 5, 1988

[51] Int. Cl.$^4$ .............................................. B60R 22/40
[52] U.S. Cl. ........................... 242/107.2; 242/107.4 A
[58] Field of Search ...................... 242/107.2, 107.4 A; 280/806, 808; 297/478, 480

[56] References Cited

U.S. PATENT DOCUMENTS

| | | | |
|---|---|---|---|
| 4,241,886 | 12/1980 | Maekawa et al. | 242/107.2 |
| 4,249,708 | 2/1981 | Asano | 242/107.2 |
| 4,323,204 | 4/1982 | Takada | 242/107.2 |
| 4,437,623 | 3/1984 | Wyder | 242/107.2 |
| 4,451,062 | 5/1984 | Ziv | 242/107.2 X |
| 4,544,112 | 10/1985 | Ziv | 242/107.2 |

FOREIGN PATENT DOCUMENTS 3539280  5/1987  Fed. Rep. of Germany ... 242/107.2

Primary Examiner—John M. Jillions
Attorney, Agent, or Firm—Clifford L. Sadler; Daniel M. Stock

[57] ABSTRACT

An inertia responsive seat belt retractor includes an actuator pendulum operatively connected to both a locking pawl mechanism for stopping protracting movement of a webbing rewind reel and to a locking cam for simultaneously lockingly engaging the seat belt webbing.

11 Claims, 2 Drawing Sheets

INERTIA RESPONSIVE SEAT BELT RETRACTOR WITH WEB LOCKER

BACKGROUND OF THE INVENTION

The present invention relates generally to locking mechanisms for preventing protraction of seat belt webbing under emergency conditions and more specifically to such mechanisms suitable for use with seat belt retractors of the inertia responsive type.

DESCRIPTION OF THE PRIOR ART

It is well known in the automotive occupant restraint arts to utilize seat belts mounted on inertia responsive retractors in which seat belt webbing is wound about a reel whose motion is stopped in the direction tending to payout webbing by operation of an inertia responsive actuator. Because a significant amount of seat belt webbing is stored curled on the reel, the seat belt webbing tends to extend from the retractor under impact as it draws up and tightens the stored webbing. It is therefore desirable to reduce or eliminate this extension by lockingly engaging the webbing at a position between the reel and the restrained occupant.

To effect this desirable locking of the seat belt webbing, it has been known that separate inertia responsive web locking devices may be employed in series with an inertia responsive seat belt retractor. Ziv, U.S. Pat. No. 4,544,112. is exemplary of this approach. Such devices have been found disadvantageous for some vehicle applications in that they require the coordination of sensitivity adjustment between the locking device for the retractor reel and the webbing locker.

Another approach k in the prior art is that of providing a seat belt ker that is responsive to webbing ten Takada, U.S. Pat. No. 4,323,204. is exemplary of such devices. These devices suffer from the disadvantage that the . device requires the Provision of substantial and componentry for directing the path of the in a manner in which movably mounted jaws or are actuated to lock the webbing. Prior art examples of this approach have generally been disadvantageously heavy and uneconomical.

Yet another approach that has been taken in the prior art exemplified in Wyder, U.S. Pat. No. 4,437,623. is also a webbing tension responsively arranges to first lock the reel and then for certain movement paying out webbing to a point at which the webbing locker is moved into an actuating This approach is disadvantageous in that requirements for certain movement of the reel the point at which its associated inertia sensing actuator moves into a locking position until t device for the webbing is brought into its condition provides an opportunity for extension may be less than optimal. It is also disadvantageous the structure necessary to accommodate the webbing take-up reel as an actuator of the web device dictates the use of relatively massive components which are both heavy and expensive.

SUMMARY OF THE INVENTION

It is an object of present invention to provide an inertia responsive automotive vehicle seat belt retractor which a simple economical mechanism for substantially simultaneously locking the reel upon which the seatbelt webbing is stored and directly locking the webbing against protraction at a position intermediate the reel and the vehicle occupant.

According to a feature of the present invention, a pivotally mounted inertia actuated pawl engages a ratchet wheel carried with the retractor's reel. A pivotally mounted cam is arranged to be lockingly engageable with the seat belt webbing and a simple actuating rod operatively interconnects the pawl and the cam to effect substantially simultaneous locking of the reel and the protracting webbing.

BRIEF DESCRIPTION OF THE DRAWINGS

These and other objects and features will be apparent to those skilled in the automotive occupant restraint arts upon reading the following description with reference to, the accompanying drawings in which.

DESCRIPTION OF THE PREFERRED EMBODIMENT

Figure 1:
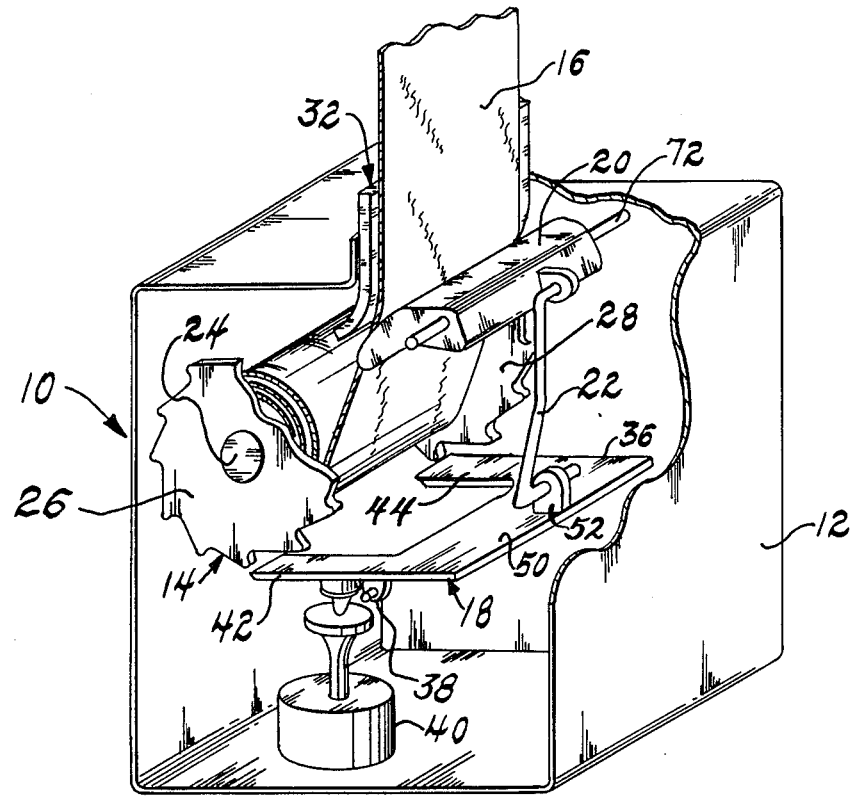
FIG. 1 is a simplified perspective view of a retractor according to the present invention.

In FIG. 1 a simplified rendering of an inertia responsive retractor assembly 10 is provided. It is to be understood that the retractor 10 is intended to be vertically mounted within the body of an automotive vehicle for restraining a seated occupant in emergency situations. The mounting of the retractor 10 within the vehicle and the arrangement of the seat belt system with respect to the occupant within the passenger compartment of the vehicle is not here illustrated since it is well known in the art and does not form a part of the invention.

The invention retractor assembly 10 is illustrated as comprising a housing 12 adapted to be mounted on a portion of a vehicle body, a take-up reel assembly 14 upon which is mounted a conventional automotive seat belt, including a length of webbing 16 wound upon the reel assembly 14, an inertia sensitive locking pawl assembly 18 lockingly engageable with the reel assembly 14, a web locking member 20 and a lock actuating rod 22.

Figure 4:
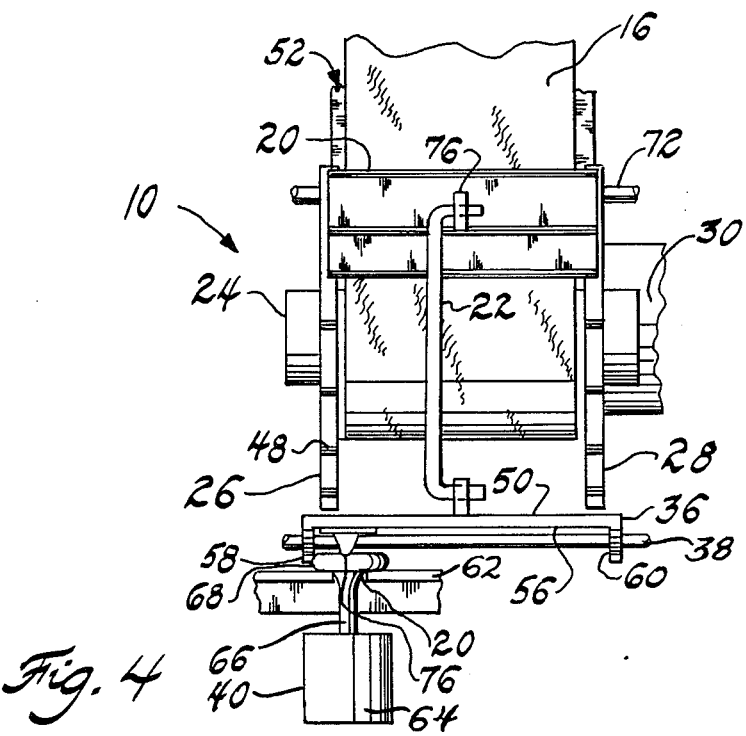
FIG. 4 is a side view of the retractor of FIG. 1.

The reel assembly 14 comprises a conventional spool having a shaft 24 mounted for rotation in the housing 12 in a known manner. A pair of toothed ratchet wheels 26, 28 are carried for rotation with the shaft 24. The seat belt webbing 16 is wound up for storage upon reel assembly 14 which is biased towards a fully retracted position in which a substantial length of the webbing 16 is stored in a wound-up condition by operation of a known rewind spring within a housing such as that indicated at 30 in FIG. 4. As the webbing 16 is paid out and away from the retractor assembly 10, it exits from the housing 12 through an opening indicated generally at 32. A smooth curved guide member 34 is preferably positioned at the opening 32 and extends across the width of the webbing 16 to provide for smoothly directing the motion of the webbing as it protracts out of or retracts into the retractor assembly 10.

The inertia responsive locking pawl assembly 18 consists of a generally U-shaped pawl plate member 36 mounted for pivotal movement with respect to the housing 12 as by movement about a transversely extending pivot pin, as indicated at 38. A spring member is preferably employed to urge the pawl plate member 36 out of engagement with the ratchet wheels 26,28. The inertia responsive locking pawl assembly 18 is further illustrated as including an actuator pendulum 40. The pawl Plate member 36 includes a pair of spaced pawls 42, 44, each having canted locking engaging tips 46 for selectively lockingly engaging any tooth 48 of each of the ratchet wheels 26, 28. A bridge portion 50 connects the pawls 42, 44 and a mounting ear 52 extends perpendicularly upwardly from the bridge portion 50 as illustrated in FIG. 1. adjacent the edge of the locking pawl plate 36 remote from the locking tips 46 of the pawls 42, 44. An actuating button 54 is formed or secured to the underside 56 of one of the pawls 42 and depending mounting ears 58, 60 are carried on the underside of each of the pawls 42, 44 for receiving the pivot pin 38. The actuator pendulum 40 is rockingly supported on a wall portion 62 of the housing 12 and is illustrated as including a relatively massive cylindrical weight portion 64 joined by a stem portion 66 to a disc-like head portion 68 having a central conical seat 70 formed in it. The seat 70 is positioned in registration with the actuating button 54 and the lower surface 72 of the head portion 68 is supported on the wall portion 62 so that tipping movement of the weight portion 64 in response to vehicle accelerations representative of emergency conditions moves the seat 70 upwardly as viewed in FIG. 2 engaging the button 54 to pivot the pawl plate 36 about the pin 38 such as indicated by the dotted line positions of FIG. 2.

The web locking member 20 is pivotally mounted through a pin 72 to the housing 12 and is formed as a bar-like member extending across the width of the webbing 16. A cam surface 74 is formed on its face adjacent the webbing 16 for locking engagement in facing relationship with the curved guide member 34 whose curved surface enhances the locking engagement. A central mounting ear 76 extends from its rear surface 78 to pivotally mount the upper end of the actuating rod 22, the lower end of which is pivotally mounted in the upstanding mounting ear 52 of the pawl plate 36.

Figure 2:
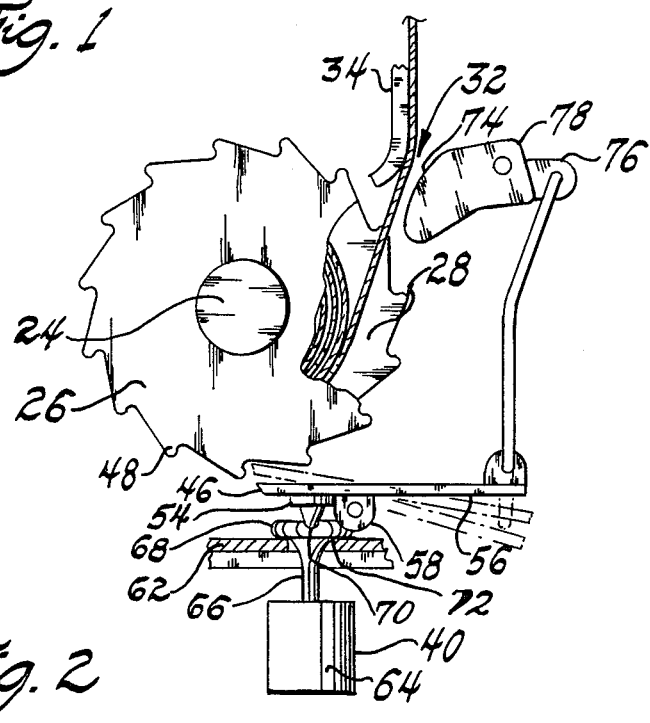
FIG. 2 is s a front view of the retractor of FIG. 1 with the housing removed.
Figure 3:
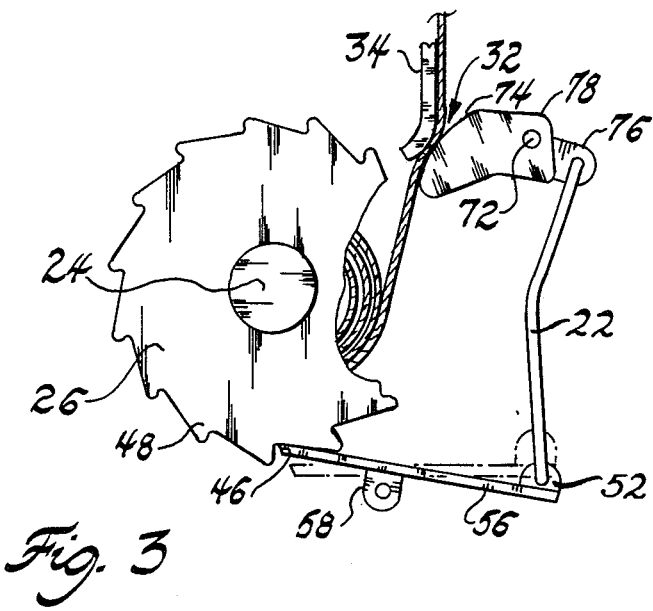
FIG. 3 is a view similar to FIG. 2 illustrating the pawl and web locking device in the locking position.

When the retractor assembly 10 is mounted in a vehicle that is subject to an acceleration above a predetermined magnitude, such as would occur during hard braking or collision, the actuator pendulum 40 rocks clockwise, as viewed in FIGS. 2 and 3, to a position in which the locking tips 46 engage a tooth 48 of the ratchet wheels 26, 28. This rocking movement, as may best be seen in FIG. 3, draws the actuating rod 22 downwardly, pivoting the locking cam 20 to compressively engage the webbing 16 between the cam surface 74 and the curved guide plate 34. It will be appreciated that a lost motion connection, such as a slot, may be provided in the mounting ear 52 to ensure that the locking of the ratchet wheels 26, 28 is not restricted by the locking of the webbing 16. Thus, the webbing 16 restraining a vehicle occupant is simultaneously locked against protracting movement out of the retractor assembly 10, both by the stopping of the protracting movement of the reel assembly 14 by engagement of the pawls 42, 44 with the teeth 48 of the ratchet wheels 26, 28, and by locking engagement the locking cam surface 74 of the web locking member 20 directly against the webbing 16 passing over the guide member 34.

While only one exemplary embodiment of the seat belt retractor according to the present invention has been described, others may be possible without departing from the scope of the appended claims.

I claim:

1. An improved inertia responsive automotive vehicle seat belt retractor comprising:

a housing adapted to be fixedly mounted to the vehicle;

a length of seat belt webbing;

a reel rotatably mounted on the housing and receiving the webbing in a wound relationship permitting the webbing to retract and protract with respect to the housing;

toothed ratchet wheel means carried for rotation with the reel;

pawl means pivotally mounted on the housing for movement between a ratchet locking position engaging a tooth of the ratchet wheel means to prevent protracting movement of the reel and a free position spaced from the ratchet wheel means;

inertia-responsive means operative to effect pivotal movement of the pawl means to the ratchet locking position;

guide means mounted on the housing adjacent the reel and adapted to guidingly receive portions of the webbing extending outwardly in the protracting direction from the reel;

a web locking member pivotally mounted on the housing in facing relationship with the guide means and movable between a web locking position lockingly urging the webbing against the guide means and a free position; and a lock actuating rod pivotally connected at one end to the pawl member and at its other end to the web locking member;

whereby movement of the inertia responsive means to effect movement of the pawl means to the ratchet locking position simultaneously effects movement of the web locking member to the web locking position.

2. A seat belt retractor as defined in claim 1 wherein the toothed ratchet wheel means comprises a pair of toothed ratchet wheels mounted on opposite ends of the reel and the pawl means comprises a U-shaped pawl plate having a pair of spaced pawls for engaging the ratchet wheels and a bridge portion connecting the pawls, the lock actuating rod being pivotally connected to the bridge portion at its one end.

3. An improved inertia responsive automotive vehicle seat belt retractor comprising:

a housing adapted to be fixedly mounted to the vehicle;

length of seat belt webbing;

a reel rotatably mounted on the housing and receiving the webbing in a wound relationship permitting the webbing to retract and protract with respect to the housing;

toothed ratchet wheel means carried for rotation with the reel;

pawl means pivotally mounted on the housing for movement between a ratchet locking position engaging a tooth of the ratchet wheel means to prevent protracting movement of the reel and a free position spaced from the ratchet wheel means;

inertia-responsive means operative to effect pivotal movement of the pawl means to the ratchet locking position;

guide means mounted on the housing adjacent the reel and adapted to guidingly receive portions of the webbing extending outwardly in the protracting direction from the reel;

a web locking member pivotally mounted on the housing having a cam surface formed thereon in facing relationship with the guide means and movable between a web locking position wherein the cam surface lockingly urges the webbing against the guide means and a free position; and a lock actuating rod pivotally connected at one end to the pawl means and at its other end to the web locking member;

whereby movement of the inertia responsive means to effect movement of the pawl member to the ratchet locking position simultaneously effects movement of the web locking member to the web locking position.

4. A seat belt retractor as defined in claim 3 wherein the toothed ratchet wheel means comprises a pair of toothed ratchet wheels mounted on opposite ends of the reel and the pawl means comprises a U-shaped pawl plate having a pair of spaced pawls for engaging the ratchet wheels and a bridge portion connecting the pawls, the lock actuating rod being pivotally connected to the bridge portion at its one end.

5. A seat belt retractor as defined in claim 3 wherein the guide means includes a curved portion positioned in the path of the webbing and the web locking member cam surface is arranged in facing relationship with the guide means curved portion to urge the webbing against the guide means curved portion in the web locking position.

6. An improved inertia responsive automotive vehicle seat belt retractor comprising:

a housing adapted to be fixedly mounted to the vehicle;

a length of seat belt webbing;

a reel rotatably mounted on the housing and receiving the webbing in a wound relationship permitting the webbing to retract and protract with respect to the housing;

toothed ratchet wheel means carried for rotation with the reel;

pawl means pivotally mounted on the housing for movement between a ratchet locking position engaging a tooth of the ratchet wheel means to prevent protracting movement of the reel and a free position spaced from the ratchet wheel means;

inertia-responsive means operative to effect pivotal movement of the pawl means to the ratchet locking position;

guide means mounted on the housing adjacent the reel and adapted to guidingly receive portions of the webbing extending outwardly in the protracting direction from the reel;

a web locking member pivotally mounted on the housing, having a cam surface formed thereon in facing relationship with the guide means, extending across the width of the webbing and movable between a web locking position wherein the cam surface lockingly urges the webbing against the guide means and a free position; and a lock actuating rod pivotally connected at one end to the pawl means and at its other end to the web locking member;

whereby movement of the inertia responsive means to effect movement of the pawl means to the ratchet locking position simultaneously effects movement of the web locking member to the web locking position.

7. A seat belt retractor as defined in claim 6 wherein the guide means includes a curved portion positioned in the path of the webbing and the web locking member cam surface is arranged in facing relationship with the guide means curved portion to urge the webbing against the guide means curved portion in the web locking position.

8. A seat belt retractor as defined in claim 6 wherein the toothed ratchet wheel means comprises a pair of toothed ratchet wheels mounted on opposite ends of the reel and the pawl means comprises a U-shaped pawl plate having a pair of spaced pawls for engaging the ratchet wheels and a bridge portion connecting the pawls, the lock actuating rod being pivotally connected to the bridge portion at its one end.

9. A seat belt retractor as defined in claim 8 wherein the lock actuating rod is pivotally mounted to the pawl plate bridge portion intermediate the pair of pawls.

10. An improved inertia responsive automotive vehicle seat belt retractor comprising:

a housing adapted to be fixedly mounted to the vehicle;

a length of seat belt webbing;

a reel rotatably mounted on the housing and receiving the webbing in a wound relationship permitting the webbing to retract and protract with respect to the housing;

toothed ratchet wheel means carried for rotation with the reel;

pawl means pivotally mounted on the housing for movement between a ratchet locking position engaging a tooth of the ratchet wheel means to prevent protracting movement of the reel and a free position spaced from the ratchet wheel means;

an actuator pendulum rockably mounted on the housing for rocking movement in response to vehicle accelerations above a predetermined magnitude and having portions directly engageable with the pawl means to effect pivotal movement of the pawl means to the ratchet locking position;

guide means mounted on the housing adjacent the reel and adapted to guidingly receive portions of the webbing extending outwardly in the protracting direction from the reel;

a web locking member pivotally mounted on the housing, having a cam surface formed thereon in facing relationship with the guide means, extending across the width of the webbing and movable between a web locking position wherein the cam surface lockingly urges the webbing against the guide means and a free position; and a lock actuating rod pivotally connected at one end to the pawl means and at its other end to the web locking member;

whereby movement of the inertia responsive means to effect movement of the pawl means to the ratchet locking position simultaneously effects movement of the web locking member to the web locking position.

11. A seat belt retractor as defined in claim 10 wherein the toothed ratchet wheel means comprises a pair of toothed ratchet wheels mounted on opposite ends of the reel and the pawl means comprises a U-shaped pawl plate having a pair of spaced pawls for engaging the ratchet wheels and a bridge portion connecting the pawls, the lock actuating rod being pivotally connected to the bridge portion at its one end and the actuator pendulum being operatively connected to one of the pawls.

* * * * *